(12) United States Patent
Vitaloni

(10) Patent No.: US 6,337,847 B1
(45) Date of Patent: Jan. 8, 2002

(54) METHOD AND ARCHITECTURAL MODEL FOR HANDLING A POOL OF HARDWARE RESOURCES

(75) Inventor: Enrico Vitaloni, Grottaferrata (IT)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/377,831

(22) Filed: Aug. 20, 1999

Related U.S. Application Data

(63) Continuation of application No. PCT/IT97/00036, filed on Feb. 21, 1997.

(51) Int. Cl.⁷ .............................................. H04L 12/26
(52) U.S. Cl. ........................ 370/217; 370/463; 370/469
(58) Field of Search .................................. 370/230, 227, 370/469, 216–221, 241, 463, 242, 244, 245, 250, 254; 714/100, 1, 2, 3, 4, 7

(56) References Cited

U.S. PATENT DOCUMENTS

| | | | |
|---|---|---|---|
| 5,627,998 A | * | 5/1997 | Mondrik et al. ............... 710/62 |
| 5,754,540 A | * | 5/1998 | Liu et al. ..................... 370/315 |
| 5,774,640 A | * | 6/1998 | Kurio ............................ 714/4 |
| 5,784,559 A | * | 7/1998 | Frazier et al. ............... 370/522 |
| 5,886,989 A | * | 3/1999 | Evans et al. ................. 370/347 |
| 5,892,926 A | * | 4/1999 | Witkowski et al. .......... 710/100 |
| 6,065,679 A | * | 5/2000 | Levie et al. ........... 235/462.47 |

OTHER PUBLICATIONS

ANSI/IEEE, "Local Area Networks, Carrier Sense Multiple Access with Collision Detection (CSMA/CD) Access Method and Physical Layer Specifications", 1985, The Institute of Electrical and Electronic Engineers, Inc., New York.

* cited by examiner

Primary Examiner—Hassan Kizou
Assistant Examiner—Saba Tsegaye
(74) Attorney, Agent, or Firm—Nixon & Vanderhye P.C.

(57) ABSTRACT

An architectural model for level 1 ISO-OSI protocol comprises two sublayers, the lowest of them (PHLR) being designed to the control functions of a common hardware platform and the highest (PHLU) being designed to the functions of the use of the hardware resources. The lowest sublayer (PHLR) does not know which is the use of the hardware resources while the highest sublayer (PHLU) does not know the implementing features of hardware resources. The lowest sublayer (PHLR) communicates with the highest sublayer (PHLU) to provide information about the status of the hardware in use. Said information is utilized to make possible the replacement of a used circuit in the event of a fault.

3 Claims, 6 Drawing Sheets

METHOD AND ARCHITECTURAL MODEL FOR HANDLING A POOL OF HARDWARE RESOURCES

This is a continuation of PCT application No. PCT/IT97/00036, filed Feb. 21, 1997, the entire content of which is hereby incorporated by reference in this application.

The present invention relates to a method and to an architectural model for level 1 ISO-OSI protocol intended to handle a pool of hardware resources, that is a common hardware platform comprising circuits all of the same type, with the main purpose to share such pool of hardware resources among different applications making use of them, ensuring easy replaceability of the circuits in use in the event of a hardware fault.

BACKGROUND OF THE INVENTION

ANSI-IEEE: "Local Area Networks, Carrier Sense Multiple Access with collision Detection (CSMA/CD) Access Method and Physical Layer Specification", 1985, The Institute of Electrical and Electronic Engineers, Inc., New York XP 002058470 155440" describes the functionalities allocated at the ISO-OSI Layer 1 Protocol as consisting of hardware control part, depending on the used physical means, and of a hardware utiliser part making use of such physical means.

However, the above mentioned document only depicts the case where one single application makes use of a number of possible physical means. It does not in any way hint at the case of several applications which makes use, at the same time, of a pool of hardware resources, all of the same type, provided by a common hardware platform.

Different applications, all working at Layer 1, can make indeed a different use of the same hardware, but the hardware as such, being the same, will be supervised and maintained in the same way, independently of what the application is.

For example, the Primary Rate Access of ISDN includes a sectionalised maintenance of the digital link according to ETSI ETS 300 233 rules, while the other types of accesses do not. Some digital links may be used for connecting the subscribers to the exchange, some others to connect exchanges among them; their handling could result in different implementations of the software managing the Layer 1 functions.

The present technology makes it possible to create compact cards hosting several circuits which implement the Layer 1 functions, such as receiver, code transmitters (CSR), Exchange Terminals (ETs), echo suppressors (ES). Therefore, now that several circuits will be hosted on the same card, the need arises to handle a pool of circuits of the same type and with the same characteristics.

Taking into account for sake of example ET circuits, when one card was corresponding to one ET circuit, each software product implementing the Layer 1 functions was controlling its number of ET cards and the concept of common hardware platform was not necessary to be introduced. To have a common supervision and maintenance of the hardware was indeed not so critical.

Presently, since a common part of the software is intended to the Layer 1 applications (the situation in terms of software products may be, for instance, the one depicted in FIG. 1 of the annexed drawings), this part will handle the supervision, testing and maintenance of the hardware.
This results in a few problems, namely:

a) Since there is the need to copy the common software part from one Layer 1 application to another one, the risk arises that a fault in this common part affects several different software products.

b) The same card can be configured in different ways according to the needs, which means that the distribution of the ET circuits among the several Layer 1 applications can differ from a card to another. This might result in some systems to an oversizing of the files existing within single software products, in order to match them to the maximum number of ET circuits to be controlled on the different cards, leading to a waste of memory usage.

c) In case an automatic change of the card is active in the event of fault, the spare card must be exactly configured as the replaced one, forcing all cards sharing the same spare unit (N+1 redundancy) to have the same distribution of ET circuits among the Layer 1 applications.

d) If a global test of the card is ordered by the operator, this function will have to poll all software products implementing the Layer 1 applications, each for its quote of controlled ET circuits.

e) To introduce a new Layer 1 application involves the repetition of the part of common software, directly managing the hardware. Presently no solution to the above mentioned problems is available, also because the possibility to host several circuits having the same function on the same card has been made available by the technology only recently.

SUMMARY OF THE INVENTION

The present invention is involved with such problems and satisfactorily solves them by providing a method and an architectural model intended to handle a pool of hardware resources.

According to the invention, a method for handling a pool of hardware resources within an architectural model for level 1 ISO-OSI protocol, of the type comprising two sublayers, the lowest of them (PHLR) being designed to the control functions of a common hardware platform and the highest (PHLU) being designed to the functions of the use of the hardware resources, wherein the lowest sublayer (PHLR) does not know which is the use of the hardware resources and the highest sublayer (PHLU) does not know implementing features of hardware resources and wherein the lowest sublayer (PHLR) communicates with the highest sublayer (PHLU) to provide information about the status of the hardware in use, is characterised in that, it utilizes said information to make possible the replacement of a used circuit in the event of a fault.

The invention furthermore concerns an architectural model for level 1 ISO-OSI protocol of the type described above, which allows the allocation of physical hardware circuits to the various applications using resources provided by the common hardware platform in a flexible way.

BRIEF DESCRIPTION OF THE DRAWINGS

The invention is now further described, referring to the annexed drawings, wherein.

DESCRIPTION OF THE PREFERRED EMBODIMENT

Figure 3:
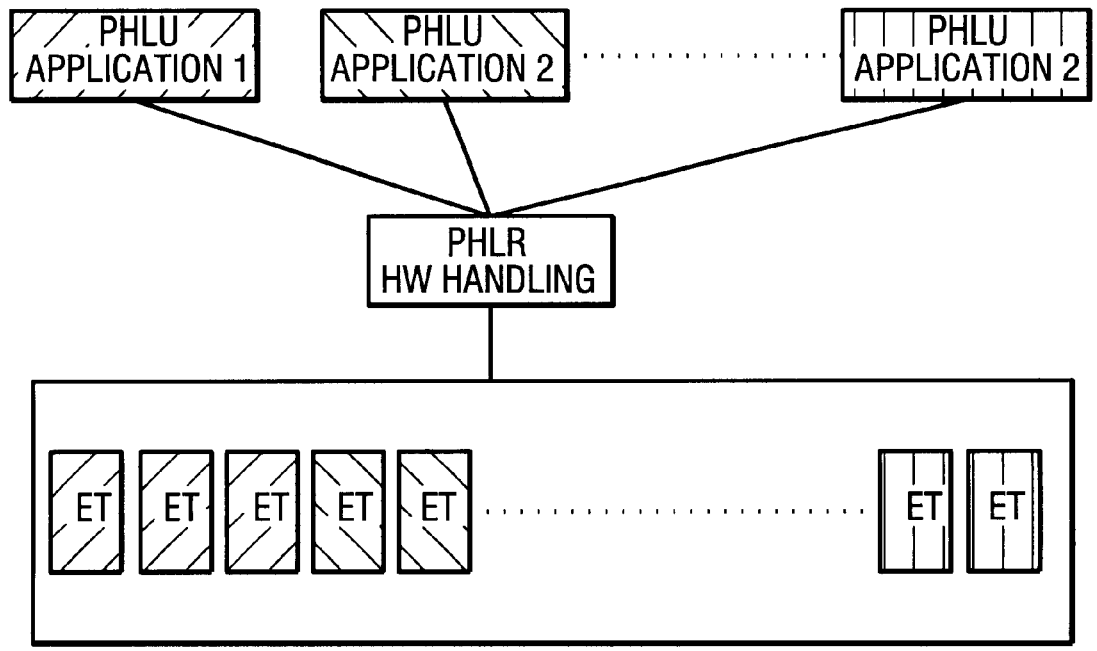
FIG. 3 is a diagram showing the use, according to the invention, of common hardware resources by means of a sublayered model as the model of FIG. 2.
Figure 2:
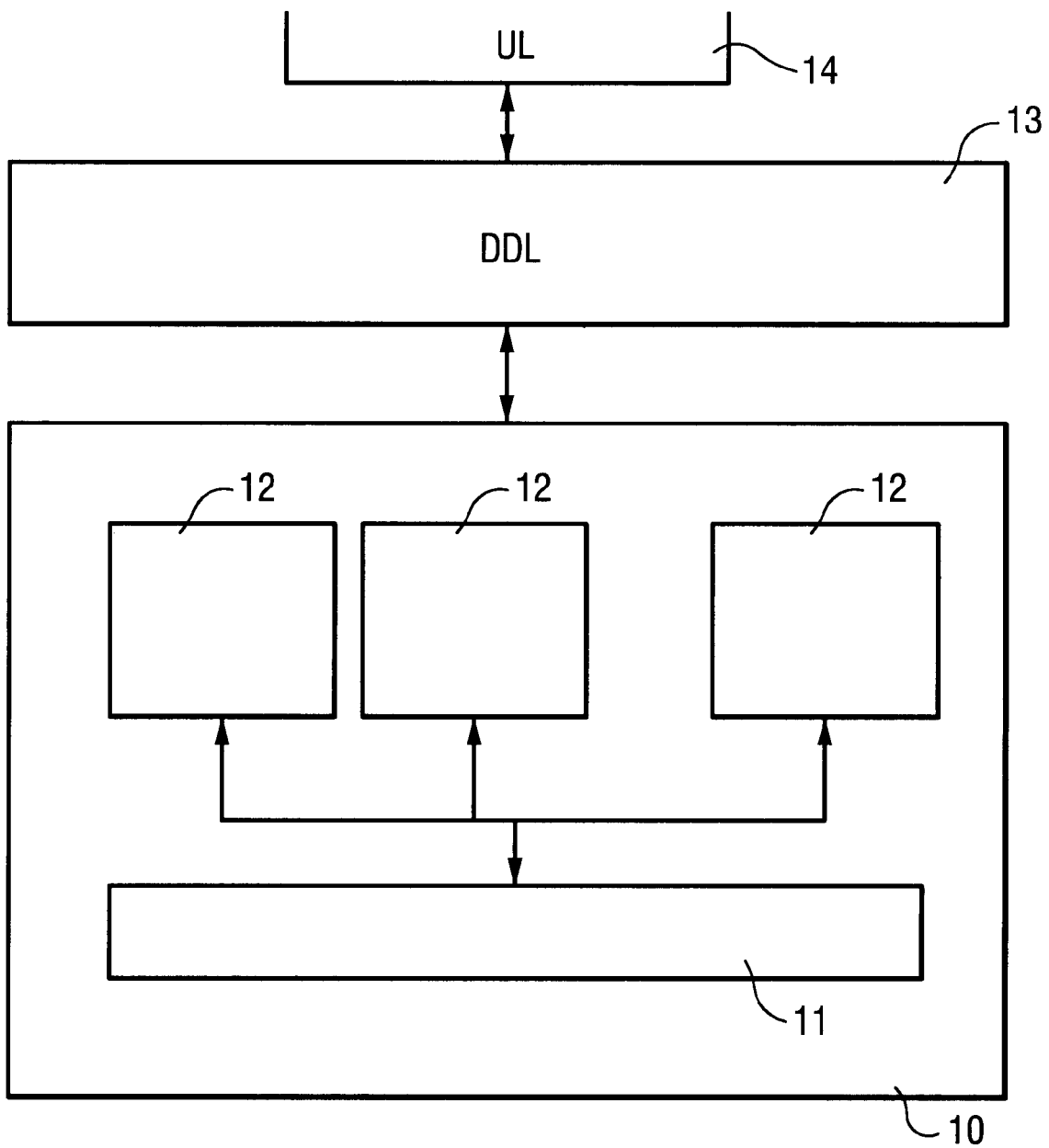
FIG. 2 shows a model intended to handle the resources of a common hardware platform according to this invention.

Referring now to the FIGS. 2 and 3, the lowest layer 10 (Physical layer) in the ISO-OSI stack model of FIG. 2 is divided into two sublayers: a lower sublayer 11—referred to as PHLR (Physical Layer Resources)—designed to implement all the tasks related to the hardware management (supervision, maintenance, test), and an upper sublayer 12, referred to as PHLU (Physical Layer Users) intended to implement all applicative aspects of the Layer 1 usage. Furthermore, FIG. 2 shows with the numeral 13 Layer 2 (DDL: DataLink Layer) of the model and simply reports (numeral 14) the highest Layers (UL) 3 to 7.

Figure 1:
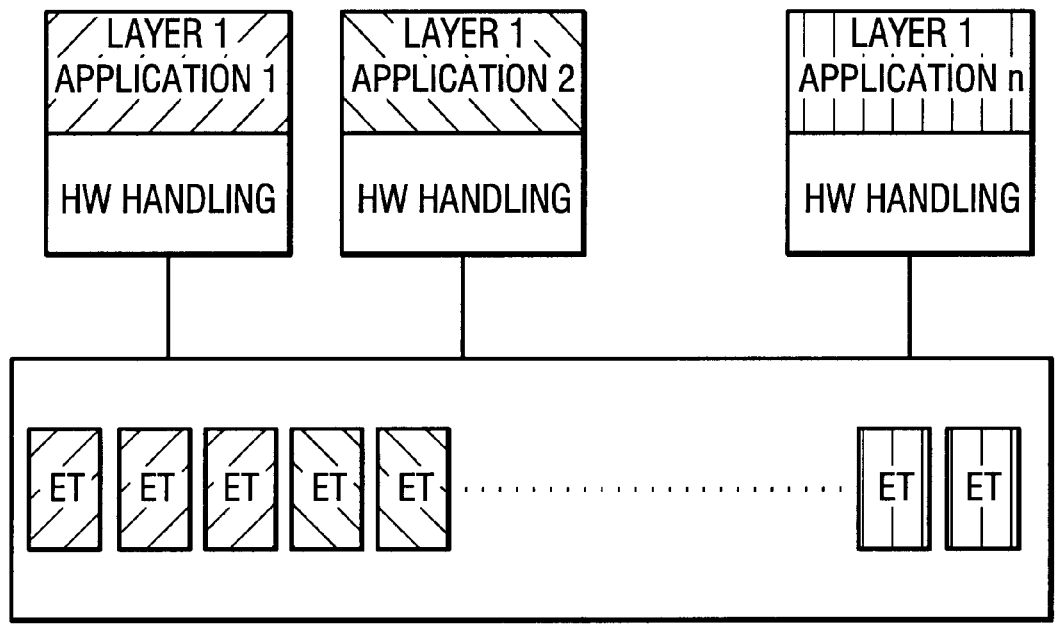
FIG. 1 is a diagram showing the use of a conventional hardware platform according to the prior art by several Layer 1 applications.

According to the invention, the implementation of the Layer 1 functions—which according to the prior art was carried out as in FIG. 1—is carried out as in FIG. 3, employing the model of FIG. 2. Thus, the part directly handling the hardware corresponds to the PHLR sub-layer and the Layer 1 applications to the PHLU sublayer. The PHLR sub-layer controls the hardware platform and does not know which is the use of the resources of the common hardware, while PHLU uses just such resources and does not know the implementing features of the hardware. The PHLR and PHLU sublayers communicate following a specific protocol, internal to the Layer 1 and—according to ISO-OSI stack model—the lowest sublayer (PHLR) provides the highest sublayer (PHLU) with the services used by the latter.

APPLICATION EXAMPLE 1

Figure 4:
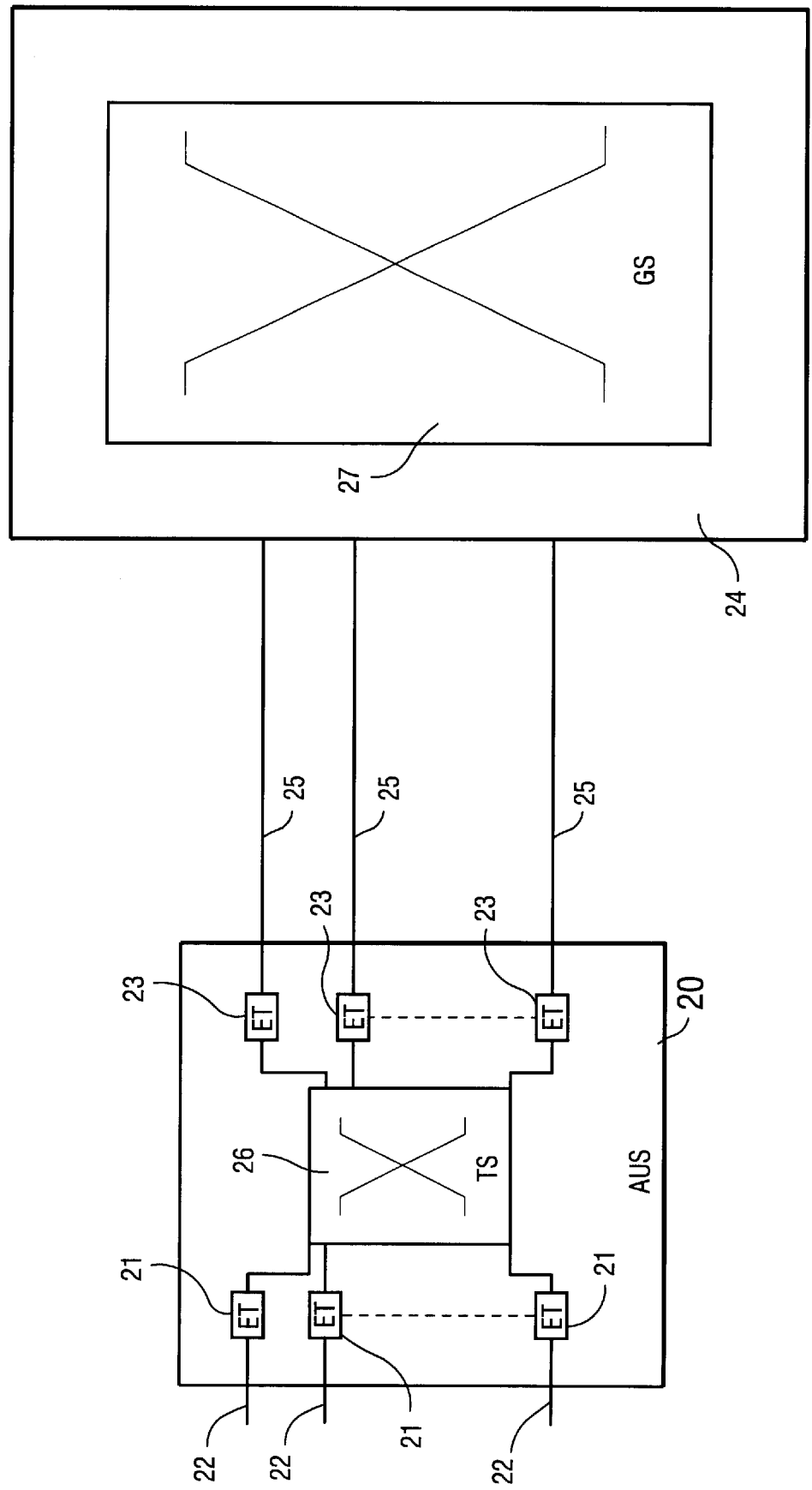
FIG. 4 shows a part of a switch system for telephone apparatuses, where the application of the model according to the invention is particularly useful.

AUS cards ("Access Unit Switch"), such as the one 20 shown in FIG. 4, are employed in a switch system recently developed by the Applicant. In such a card, a first group 21 of ET circuits is employed to connect subscriber 2048 kbits/s lines 22 and a second group 23 of ET circuits is employed in order to connect the subscriber stage to the main switch 24 of the exchange, by means of 2048 bits/s lines 25.

A subscriber selector TS (Time Switch) 26 in the AUS card 20 enables the transport of information, both by speech and by signaling, from an ET circuit to another one within the same card.

A group selector GS (Group Switch)27 in the main switch 24 enables the connection among ET circuits (namely among users) of different AUS cards (only one being shown in FIG. 4).

All circuits on AUS card are implemented in the same way, but they are employed for different purposes.

If the traditional managing model were employed in the above AUS cards—according to which a first software controls the ET circuits used to connect the users and a second, different software controls the ET circuits employed to connect the subscriber stage to the main switch—there would be no possibility to take advantage of the group of ET circuits of the card as a hardware platform being in common for several applications extracting and using the hardware resources.

On the contrary, the application to AUS cards of the management model according to the invention results in:

- the possibility to change the number of ET circuits of different cards and to differently distribute them into the ones relevant to users and the ones relevant to the main switch;
- the possibility to insert new users of the hardware resources, without modifying the manager of the same resources;
- an improved software quality, since a sole product manages the whole hardware;
- the possibility that the configuration of spare AUS cards is not predefined, since a spare AUS inherits the distribution of ET circuits into users and main switch from the faulty AUS upon the automatic substitution of a faulty AUS; and
- as a consequence of the previous item, the possibility not to assign the identical, rigid configuration to each AUS card sharing the same spare card.

APPLICATION EXAMPLE 2

Figure 5:
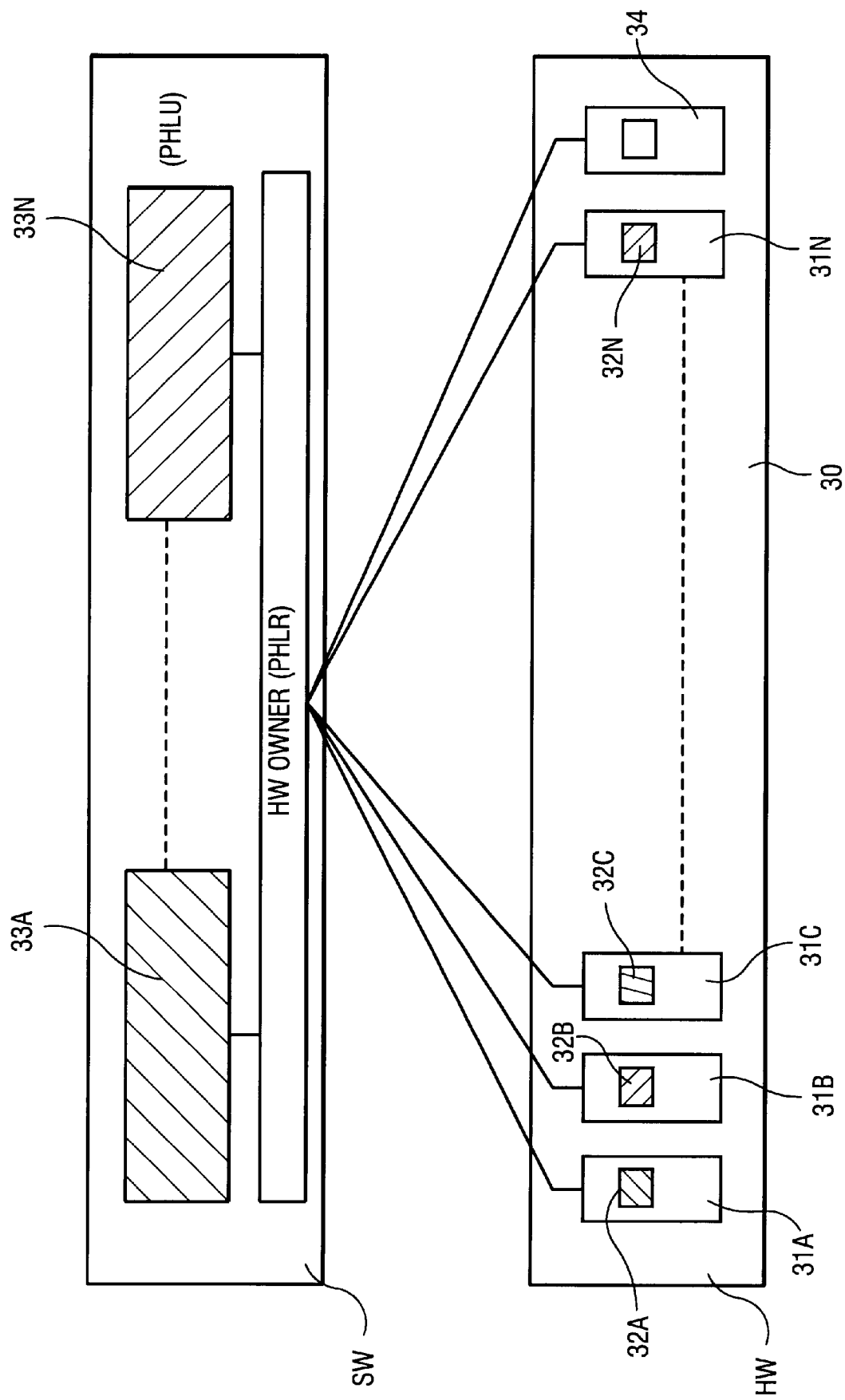
FIG. 5 shows a further application example of the model according to the invention.

Several not specific hardware cards 31A . . . 31N are installed (FIG. 5) in a new magazine 30. They are instanced by a specific firmware in the microprocessor 32A . . . 32N of the same cards, in order to intend the latter to a specific application. In the example in FIG. 5, the cards 31A and 31C are instanced in microprocessors 32A and 32C by a firmware which devotes them to application 1 (numerals 33A in FIG. 5), the cards 31B and 31N being instanced in the microprocessors 32B and 32N by a different firmware which devotes them to application N (numeral 33N in FIG. 5).

The cards 31 involve identical circuits, but the programs downloaded in respective microprocessors 32 thereon change, depending on the user of each card. All cards but one are used by different applications, the latter card 34 being spared to automatically substitute a possible faulty one.

Such an implementation is only possible with a management model according to this invention, which separates the use of the hardware from its control. Indeed, such a model provides a manager of the common hardware platform that assigns the resources of said platform to the different software users. Since it is a priori unknown which card is going to fail, it may not be foreseen to which application the spare card will be assigned; anyway, according to the managing model of this invention, it is enough to assign the spare card to the software using the faulty one, after instanced by downloading thereon the firmware characteristic of such an application. This would be not possible according to a traditional model, since each user software is also manager of its amount of cards, that is rigidly assigned and may not be re-configured if mistaken.

The first three advantages listed in the previous example are obtained also according to this application.

In order to better clarify an information flow exchanged between the hardware control and PHLR and the user of the faulty circuit, it is to be considered that the two sublayers PHLR and PHLU communicate following a specific protocol, internal to the Layer 1 and the lowest sublayer (PHLR) offers services to the highest one (PHLU) which uses them, as already set forth above.

Primitives within this protocol are for instance the following ones:

---

From PHLR to PHLU:

a) PHLR_fault_ind     to report fault in the hardware
b) PHLR_fault_cease_ind     to report the ceasing of a hardware fault
c) PHLR_HW_change_ind     to report a change of the hardware due to -continued

| | automatic hardware change in the event of hardware fault. |
|---|---|
| From PHLU to PHLR: | |
| a) PHLR_HW_change_ans | to accept the hardware change |
| b) PHLR_HW_change_rej | to reject the hardware change |
| c) PHLR_user_ind | to inform about the PHLU address of the function using the HW. |

Both sublayers communicate according to the following sequential scheme, if no change is provided:

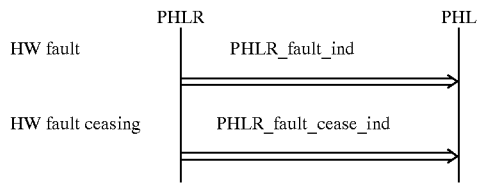

According to this scheme, PHLR informs PHLU that a hardware fault is occurring; the latter stops its functions, until the fault ceases, either because spontaneously ceased or because a manual change has taken place in the hardware.

On the contrary, if automatic change is provided, the sequential scheme is the following:

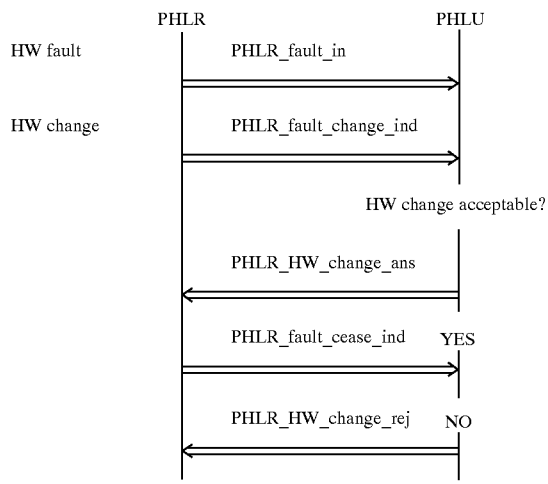

According to this scheme, PHLR informs PHLU that a hardware fault is occurring and that a change is possible; PHLU answers whether such a change is acceptable or not; in the first case an automatic hardware change removes the fault; in the second case, the PHLU functions are stopped until the fault ceases, either spontaneously or because a manual change has taken place in the hardware.

The sequential scheme to assign PHLU instances to PHLR instance is the following:

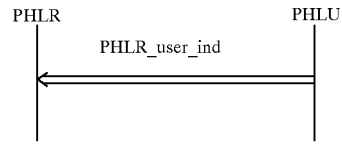

In order to let PHLR know which of the PHLU functions is actually using the hardware.

This protocol could comprise other primitives and the list above has not to be exhaustive, but it only shows an example of the interwork between the two sublayers within the Layer 1.

APPLICATION EXAMPLE 3

Figure 6:
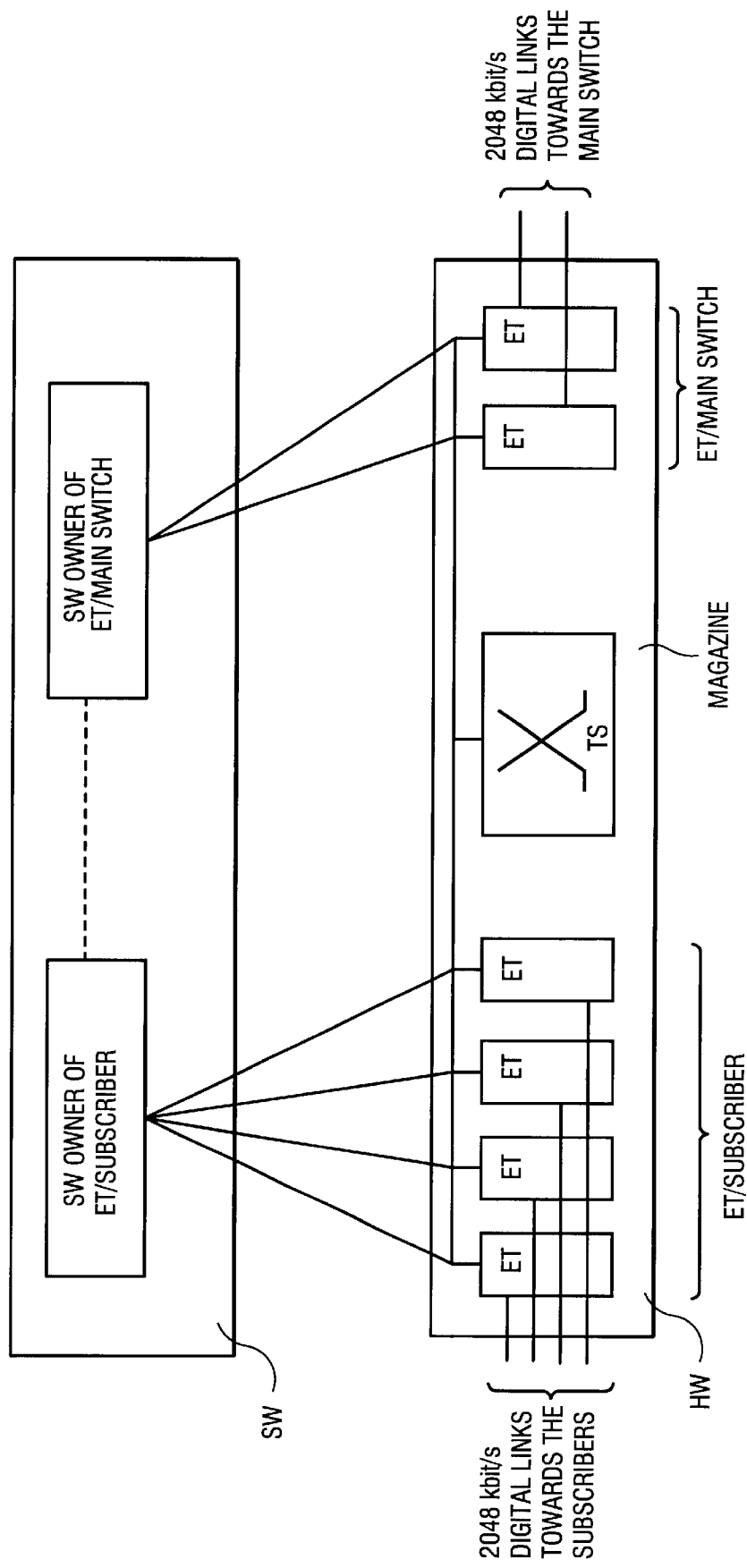
FIGS. 6 and 7 show two different uses—respectively according to the prior art and to the present invention—of the cards in magazines of a switch system employed for telephone apparatuses.

Four ET cards for the connection to the subscriber lines and two ET cards for the connection of the subscriber stage to the main switch are used in the magazines employed by the Applicant to connect the 2048 kbits/s digital subscriber lines in a switch system as the one described in Example 1. These cards are presently controlled by two different softwares, as shown in FIG. 6, and the possible problems of the traffic flow between the sides (depending on the kind of connected subscribers) are nowadays solved by providing said magazines with less ET cards on the subscriber side, in order to reduce the so that both cards on main switch side can manage it.

Figure 7:
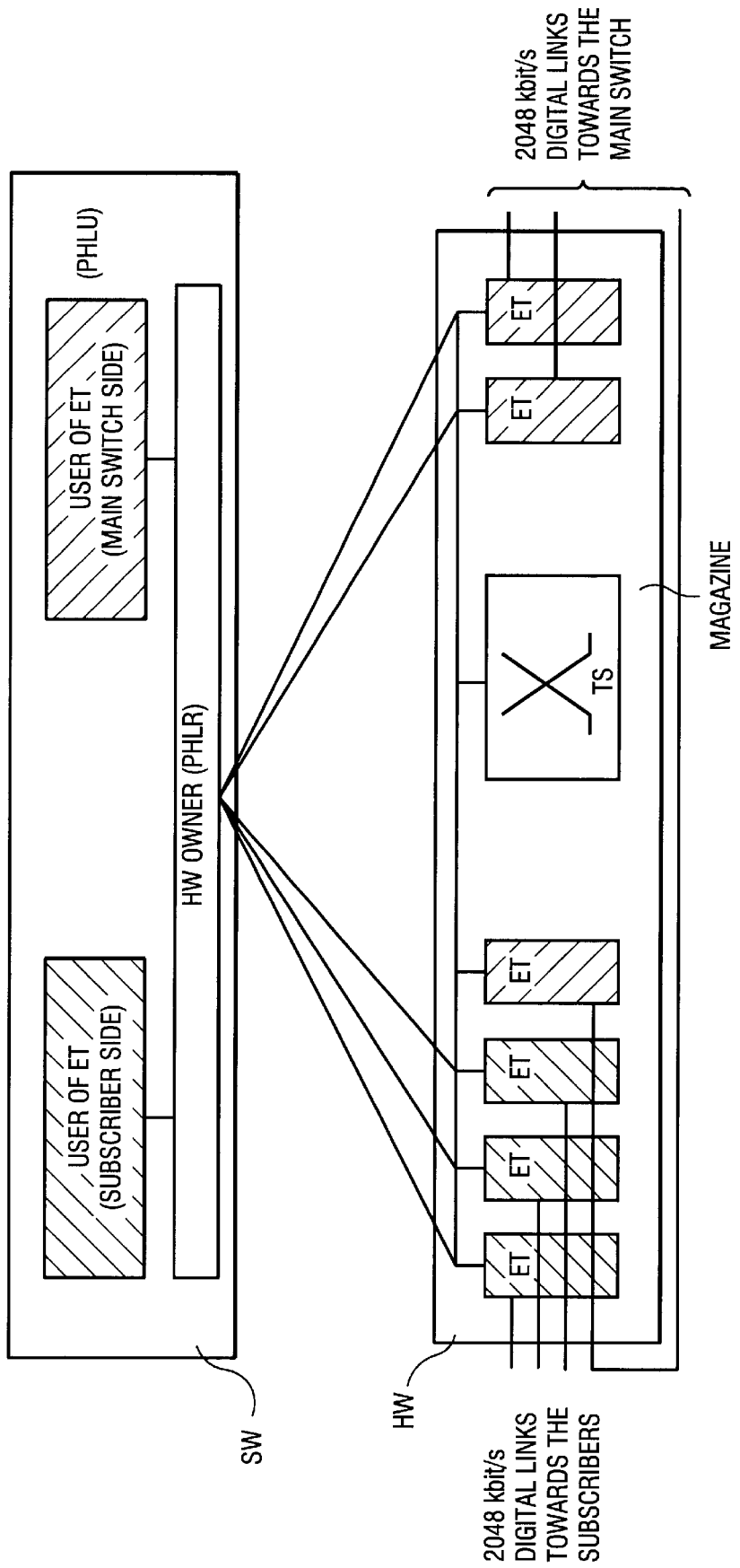

The use of the management model according to the invention makes it possible to distribute the six ET cards fully arbitrarily to both applications (subscriber side and main switch side) for each magazine, as shown in FIG. 7. A better traffic management results (for instance by assigning three ET cards to the subscriber side and three ET cards to the main switch side), while advantage is totally taken of the capa city of each magazine.

The architectural model according to the invention attains a lot of improvements, the most important of them being:

a tidy interface (actually a protocol) is defined between the Layer 1 resource owner (PHLR) and the Layer 1 applications (PHLUs) using those resources;

when applying the model wherein the hardware handling are very well separated—as above—from the hardware usage ones, it is possible to obtain at software level different products implementing the two hardware functions with clear interfaces between them;

the part handling the hardware (PHLR sublayer) is unique within the system and is only dependant on the hardware design (different hardware platform correspond to different instances of the PHLR sub-layer): thus the problem under item a) (page 2) is solved;

all applicative aspects are left outside the hardware handling function (PHLR) and put in the PHLU sublayer which may consist of several instances interworking with a common PHLR sublayer (i.e. hardware platform); there is an instance of the PHLU sublayer for each user of the hardware platform and the actual distribution of the PHLU functions over different cards implementing the same hardware platform can differ from card to card, being implemented in the PHLU sublayer: thus the problem under item b) (page 2) is solved;

in case of hardware fault or hardware change due to an automatic fault recovery, PHLR sublayer only informs the PHLU sublayer, which is responsible for all decisions in handling this event; this ensure a higher degree of flexibility and the hardware tests and the maintenance activities are smoother and straightforward; therefore the problem under item d) (page 3) is solved;

the cards where ET circuits are defined need to be configured only when used for the traffic; the process of configuration in the spare cards intended to replace faulty cards can be stopped just to the definition of PHLR sublayer, whilst the distribution of PHLU sublayers can be copied from the faulty cards upon the substitution; then, also the problem under item c) (page 3) is solved;

the separation of the control functions from the usage ones of hardware enables an easy addition of software applications that use the resources from an existing hardware platform, due to the well defined protocol between the PHLR and PHLU sublayers without affecting the existing applications (PHLU) or said platform (PHLR); then, also the problem under item e) (page 3) is solved.

Of course, other embodiments and applications of the invention are possible, different from the ones described. Particularly, the model according to the invention, when convenient, may be applied to the conventional technology, for instance to cards carrying only one single circuit thereon.

What is claimed is:

1. A method of handling a pool of hardware resources within an architectural model for level 1 ISO-OSI protocol comprising two sublayers, the lowest of them (PHLR) being designed to the control functions of a common hardware platform and the highest (PHLU) being designed to the functions of the use of the hardware resources;

providing the architectural model for level 1 ISO-OSI protocol such that the lowest sublayer (PHLR) does not know which is the use of the hardware resources, the highest sublayer (PHLU) does not know the implementing features of hardware resources, and the lowest sublayer (PHLR) communicates with the highest sublayer (PHLU) to provide information about the status of the hardware in use; and the lowest sublayer (PHLR) informing the highest sublayer (PHLU) of a fault in one of a plurality of hardware cards, and the PHLR and PHLU sublayers communicating in order to automatically remove the fault through the use of a previously non-configured card so that said information makes possible the replacement of a used circuit of a card in the event of a fault.

2. The method of claim 1, wherein in response to learning of the fault the PHLU layer informs the PHLR layer whether the fault will be addressed by: a) accepting replacement of the fault via the non-configured card, or b) stopping PHLU functions until the fault ceases.

3. A method of handling a pool of hardware resources within an architectural model for level 1 ISO-OSI protocol comprising two sublayers, a lower sublayer of the protocol being designed to the control functions of a common hardware platform and a higher sublayer of the protocol being designed to the functions of the use of the hardware resources;

providing the architectural model for level 1 ISO-OSI protocol such that the lower sublayer does not know which is the use of the hardware resources, the higher sublayer does not know the implementing features of hardware resources, and the lower sublayer communicates with the higher sublayer to provide information about the status of the hardware in use; and the lower sublayer informing the higher sublayer of a fault in one of a plurality of hardware cards, and the lower and higher sublayers communicating in order to automatically remove the fault through the use of a previously non-configured card so that said information makes possible the replacement of a used circuit of a card in the event of fault.

* * * * *